(12) United States Patent
Lee

(10) Patent No.: US 7,969,716 B2
(45) Date of Patent: Jun. 28, 2011

(54) SLIDING-TYPE PORTABLE ELECTRONIC DEVICE

(75) Inventor: Po-Yi Lee, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 110 days.

(21) Appl. No.: 12/429,285

(22) Filed: Apr. 24, 2009

(65) Prior Publication Data

US 2010/0118474 A1 May 13, 2010

(30) Foreign Application Priority Data

Nov. 12, 2008 (CN) .......................... 2008 1 0305492

(51) Int. Cl.
*H05K 7/14* (2006.01)

(52) U.S. Cl. .............. 361/679.01; 361/679.56; 361/727; 455/575.4; 379/433.12

(58) Field of Classification Search ............. 361/679.01, 361/679.02, 679.08, 679.09, 679.19, 679.3, 361/679.56–679.58, 679.55, 727; 455/575.1–575.4; 379/433.11–433.13

See application file for complete search history.

(56) References Cited

U.S. PATENT DOCUMENTS

| 7,496,388 | B2 * | 2/2009 | Kim | ........................... 455/575.4 |
| 2004/0137970 | A1 * | 7/2004 | Han | ........................... 455/575.3 |
| 2007/0037618 | A1 * | 2/2007 | Lee | ........................... 455/575.4 |

* cited by examiner

*Primary Examiner* — Jayprakash N Gandhi
*Assistant Examiner* — Ingrid Wright
(74) *Attorney, Agent, or Firm* — Steven M. Reiss

(57) ABSTRACT

A sliding-type portable electronic device comprises a first body; a second body, a sliding mechanism and a rotating component. The sliding mechanism is secured on the second body and slidably assembled on the first body. The rotating component is rotatably assembled in the first body. The sliding mechanism slides in the first body and hits the rotating component. The sliding mechanism can hit the rotating component to make a silvery sound, thereby enhancing entertainment and personalization of the portable electronic device.

11 Claims, 5 Drawing Sheets

SLIDING-TYPE PORTABLE ELECTRONIC DEVICE

BACKGROUND

1. Technical field

The present disclosure generally relates to sliding-type portable electronic devices and, particularly, to a sliding-type portable electronic device capable of making sounds when opened or closed.

2. Description of Related Art

A typical portable electronic device provides wireless communication services to its subscriber while wirelessly communicating with its base station. Generally, the portable electronic device can be classified into three or more types including bar-type, flip-type, and sliding-type.

Generally, the sliding-type of the portable electronic device includes an upper housing, a lower housing and a sliding mechanism. The sliding mechanism includes a fixing part and a sliding part slidably matching to the fixing part. The fixing part is secured on the lower housing. The sliding part is secured on the upper housing. The sliding mechanism is used to drive the upper housing to slide on the lower housing in an opened state or a closed state. However, when opening or closing the portable electronic device, the sliding part smoothly slides on the fixing part, and the portable electronic device may not make any sound. Therefore, this kind of the portable electronic device lacks of entertainment and personalization.

Therefore, there is room for improvement within the art.

BRIEF DESCRIPTION OF THE FIGURES

Many aspects of the sliding-type portable electronic device can be better understood with reference to the following figure. The components in the figure are not necessarily drawn to scale, the emphasis instead being placed upon clearly illustrating the principles of the sliding-type portable electronic device. Moreover, in the figure like reference numerals designate corresponding parts throughout the several views, in which.

DETAILED DESCRIPTION OF EMBODIMENTS

Figure 1:
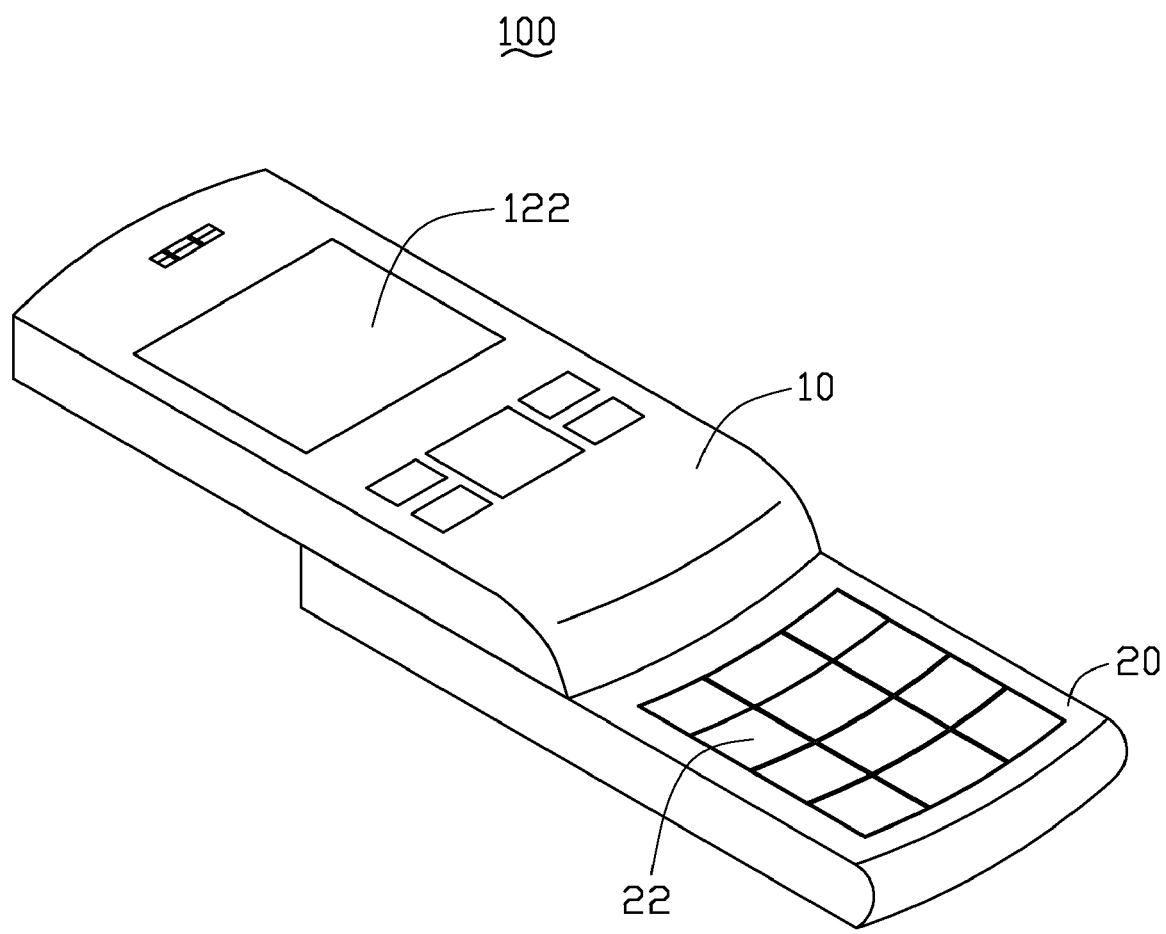
FIG. 1 is a schematic assembled view of a portable electronic device in an opened state according to an exemplary embodiment.
Figure 2:
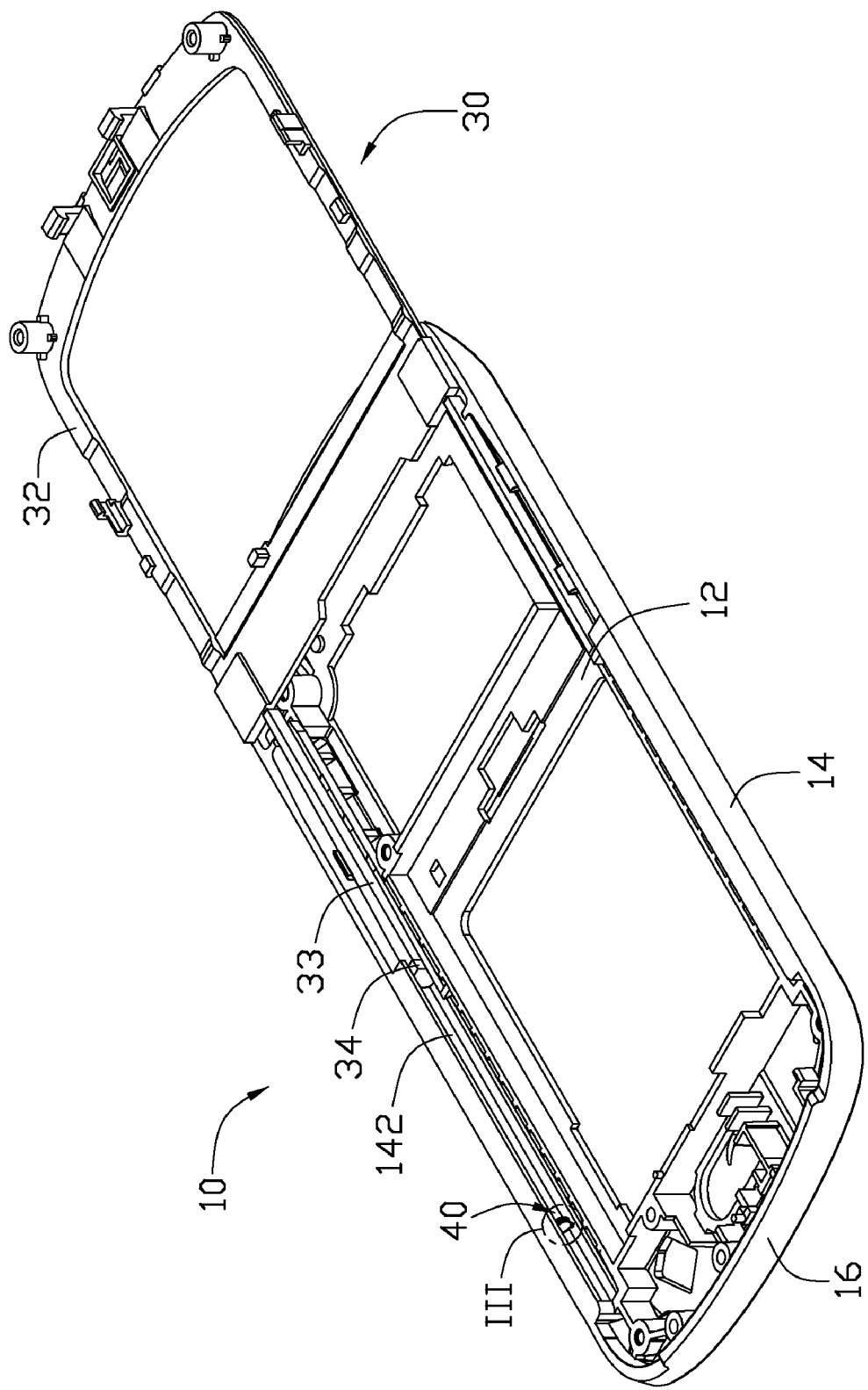
FIG. 2 is a schematic view of a sliding mechanism assembled on a second body of the portable electronic device.

FIGS. 1 and 2 show an exemplary of a sliding-type portable electronic device 100 including a first body 10, a second body 20, a sliding mechanism 30 and one or more rotating components 40. The first body 10 is assembled on the second body 20 by the sliding mechanism 30.

The first body 10 is substantially rectangular and includes a main wall 12, two sidewalls 14 bent from two sides of the main wall 12 facing each other, and two end walls 16 bent from the other sides of the main wall 12 facing each other. The main wall 12 includes an area for a display screen 122 for displaying information. Each of two sidewalls 14 defines a slot 142.

The second body 20 has the same length and width as the first body 10. The second body 20 includes an area for a plurality of keys 22 configured for inputting information to the sliding-type portable electronic device 100.

The sliding mechanism 30 includes a sliding frame 32, two guiding portions 33 and two hitting blocks 34. The guiding portions 33 are bar-shaped and extend from one side of the sliding frame 32. Each of the guiding portions 33 is slidably assembled in a corresponding slot 142. Therefore, the sliding frame 32 is slidable on the first body 10. The second body 20 is fixed on the sliding frame 32 and slides relative to the first body 10.

The hitting blocks 34 can be made of metal, and respectively secured on one end of the guiding portions 33.

Figure 3:
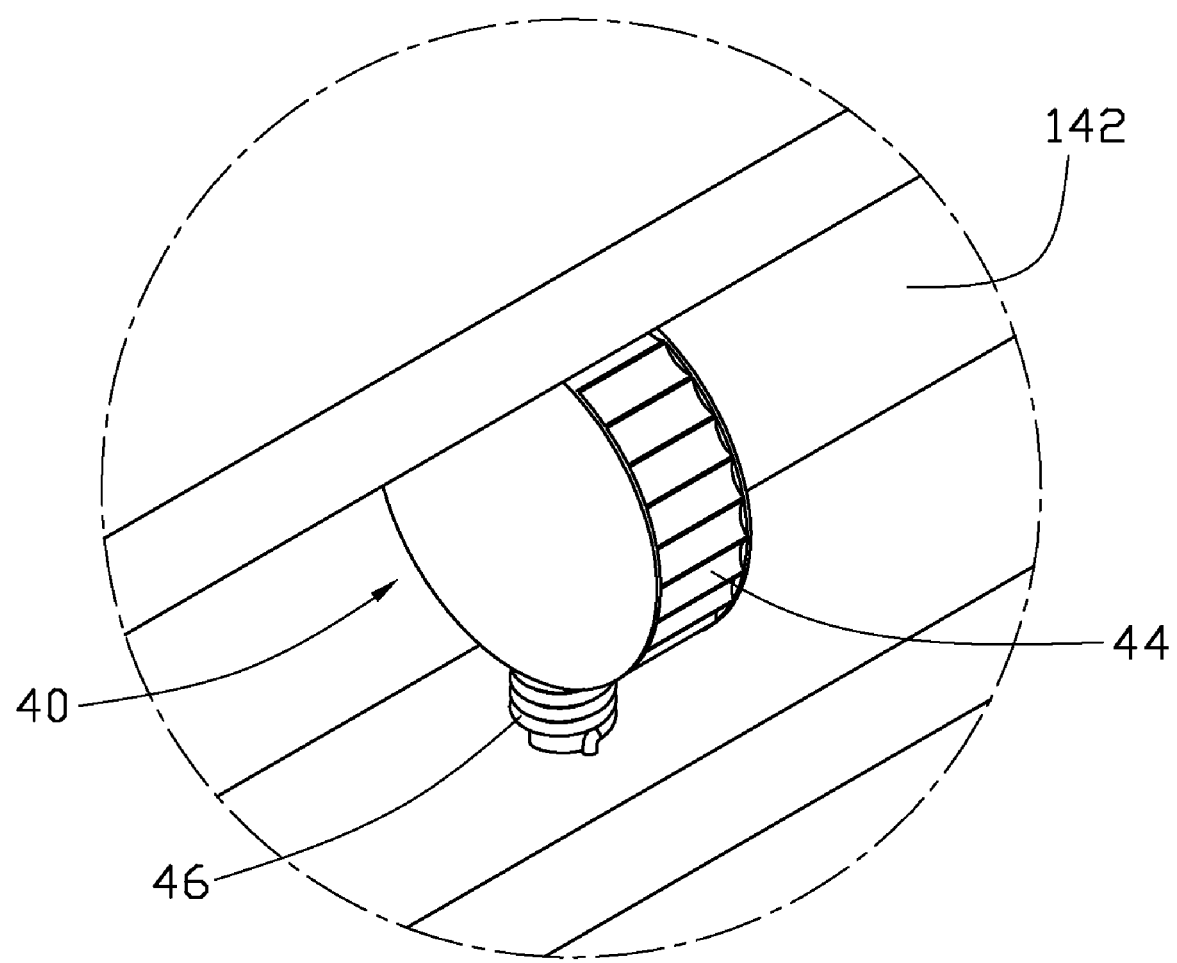
FIG. 3 is an enlarged view of the area III shown in FIG. 2.
Figure 4:
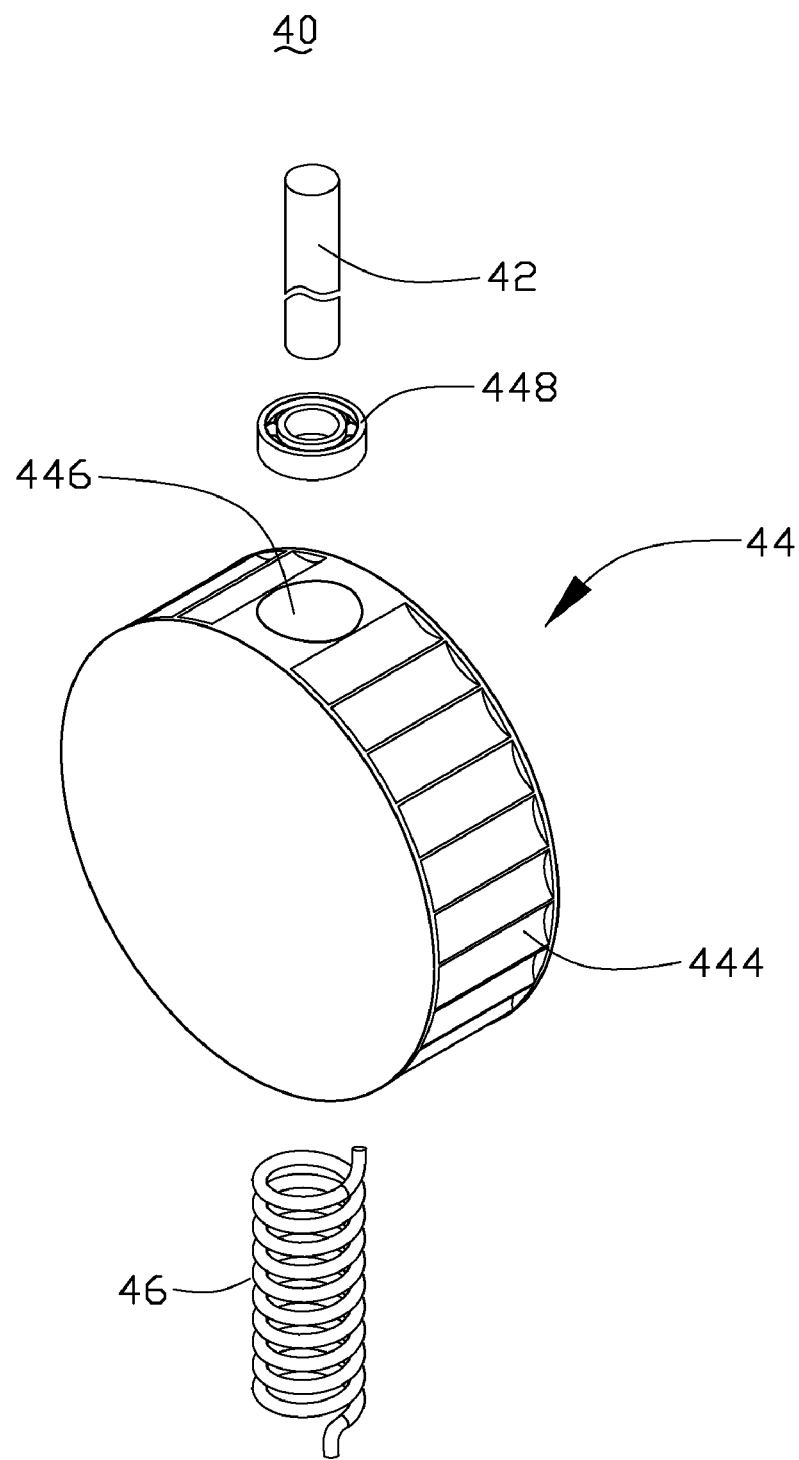
FIG. 4 is an exploded view of a rotating component of the portable electronic device.

Referring to FIGS. 3 and 4, each of the rotating components 40 includes a shaft 42, a rotating part 44 and an elastic part 46. The shaft 42 can be cylindrical. The rotating part 44 can be a solid disk and made of metal. The rotating part 44 includes a peripheral wall 444 defining a through hole 446 passing through a center of the rotating part 44, and a bearing 448 engaging in the through hole 446. An axis of the bearing 448 aligns with a center of the through hole 446. The shaft 42 is inserted into the through hole 446 and engages with the bearing 448, thereby the rotating part 44 is rotatable about shaft 42. The elastic part 46 is a torsion spring and configured to be assembled on the shaft 42. One end of the elastic part 46 is secured on the peripheral wall 444 adjacent to the through hole 446, the other end of the elastic part 46 is secured on a bottom of the slot 142. The shaft 42 is secured in the slot 142. The rotating part 44 and the guiding portions 33 define an included angle, the included angle may be about 20 to 160 degrees.

Figure 5:
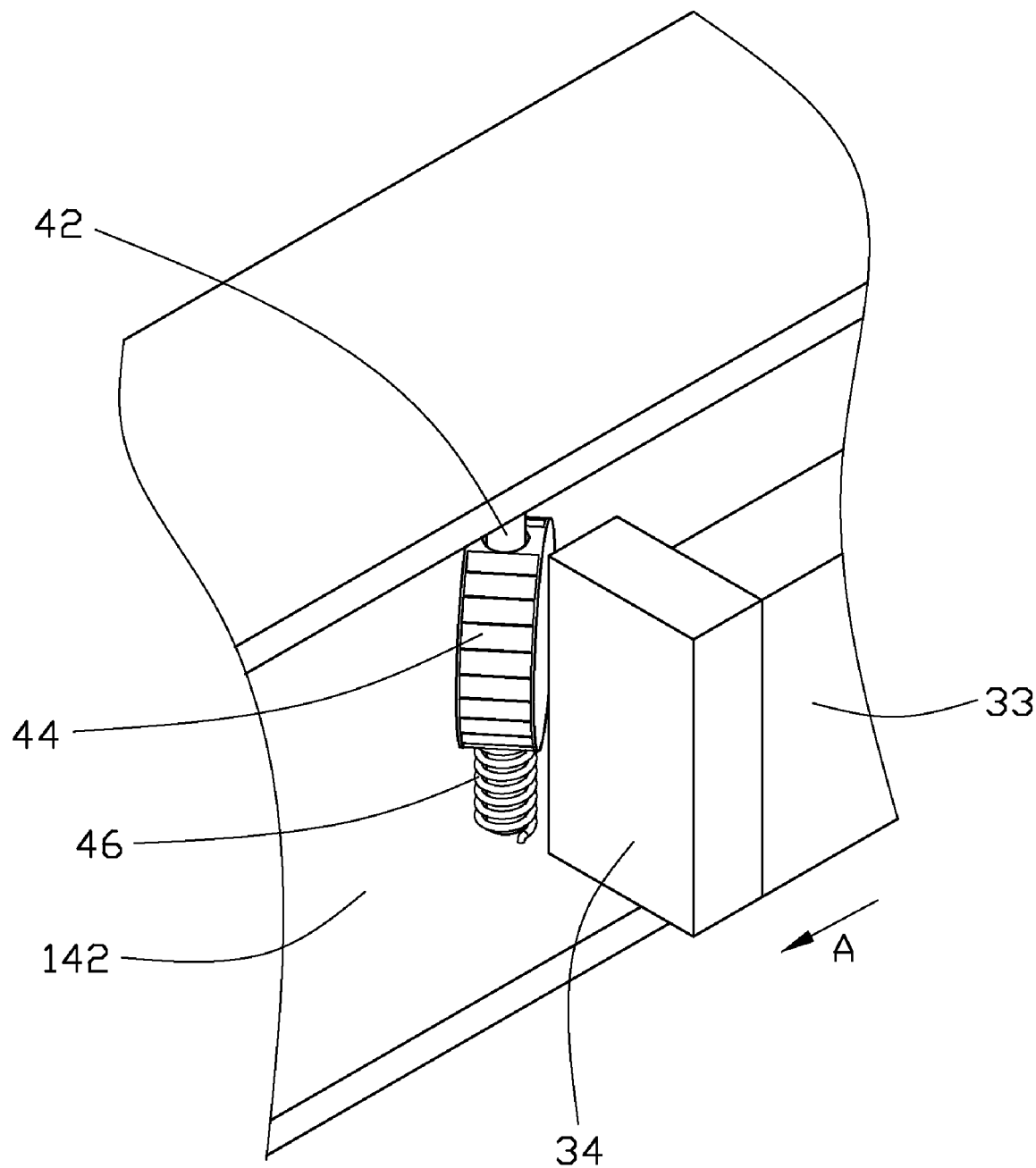
FIG. 5 is a schematic view of the rotating component hit by a hitting block during closing process.

Referring to FIG. 5, during closing of the sliding-type portable electronic device 100, the second body 20 is pushed and drives the guiding portions 33 sliding along a direction designated by arrow line A. The hitting blocks 34 hits the rotating part 44 to make a sound. Meanwhile, the rotating part 44 rotates at an angle by hit of the hitting blocks 34, thereby the elastic part 46 generates a restoring force.

During opening of the sliding-type portable electronic device 100, the second body 20 is pushed and drives the guiding portions 33 sliding away from the rotating part 44. The rotating part 44 rotates to its original position by the restoring force of the elastic part 46.

It is to be understood that the guiding portions 33 can be made of metal and directly contacting the rotating part 44, therefore the hitting blocks 34 can be omitted.

It is to be understood that the bearing can be omitted. The shaft 42 can directly insert into the through hole 446 of the rotating part 44.

It is to be understood that the hitting blocks 34 and the rotating part 44 can be made of other hard material (e.g., plastic).

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A sliding-type portable electronic device, comprising:
   a first body comprising two sidewalls facing each other and defining a slot;
   a second body;

a sliding mechanism secured on the second body and slidably assembled on the first body;

a rotating component rotatably assembled in the first body, the rotating component comprising a shaft, a rotating part and an elastic part, the shaft secured in the slot, the shaft inserted into the rotating part, the rotating part rotatably assembled on the shaft, an end of the elastic part fixed on the rotating part, the other end of the elastic part fixed to the sidewall;

wherein when the sliding mechanism slides in the first body, a portion of the sliding mechanism hits the rotating component to make a sound.

2. The sliding-type portable electronic device as claimed in claim 1, wherein the sliding mechanism slidably assembled in the slot, the rotating component rotatably assembled in the slot.

3. The sliding-type portable electronic device as claimed in claim 2, wherein the rotating part has a bearing secured therein, the rotating part rotatably assembled on the shaft via the bearing.

4. The sliding-type portable electronic device as claimed in claim 2, wherein the elastic part is a torsion spring.

5. The sliding-type portable electronic device as claimed in claim 4, wherein the rotating part and the sliding mechanism are made of metal.

6. The sliding-type portable electronic device as claimed in claim 5, wherein the sliding mechanism includes a sliding frame and a guiding portion extending from one side of the sliding frame, a hitting block is secured on an end of the guiding portion, made of metal, and comprising the part of the sliding mechanism that hits the rotating part to make the sound.

7. The sliding-type portable electronic device as claimed in claim 6, wherein the rotating part and the guiding portion define an included angle of 20-160 degrees.

8. A sliding-type portable electronic device, comprising:
a first body;
a second body;
a sliding mechanism secured on the second body and slidably assembled on the first body, the sliding mechanism comprising a sliding frame and a guiding portion extending from one side of the sliding frame, a hitting block secured on an end of the guiding portion and made of metal;
at least one rotating component comprising:
a shaft secured in the first body,
a rotating part rotatably assembled on the shaft, and
an elastic part coiled around the shaft and an end of the elastic part secured on the rotating part, the other end of the elastic part secured on the first body;
wherein the sliding mechanism slides on the first body and hits the rotating part, the rotating part and the elastic part rotates about the shaft.

9. The sliding-type portable electronic device as claimed in claim 8, wherein the first body includes two sidewalls facing each other, each sidewall defines a slot, the sliding mechanism slidably assembled in at least one of the slots, the shaft of the at least one rotating component secured in at least one of the slots.

10. The sliding-type portable electronic device as claimed in claim 9, wherein the rotating part has a bearing secured therein, the rotating part is rotatably assembled on the shaft by the bearing.

11. The sliding-type portable electronic device as claimed in claim 8, wherein the rotating part and the sliding mechanism are made of metal.

* * * * *